May 8, 1951 — E. G. HILLS — 2,551,740
ELECTRONIC COMPUTING APPARATUS
Filed May 3, 1946 — 3 Sheets-Sheet 1
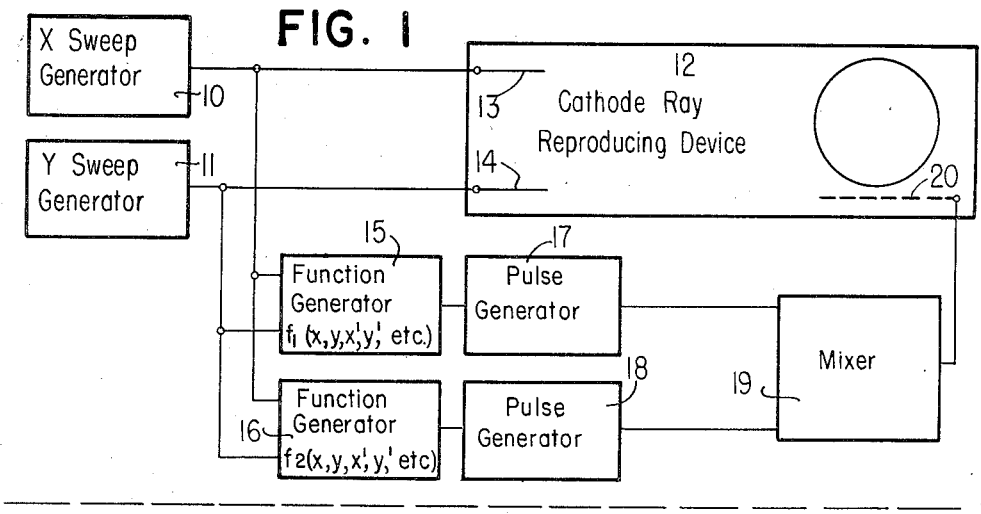
FIG. 1
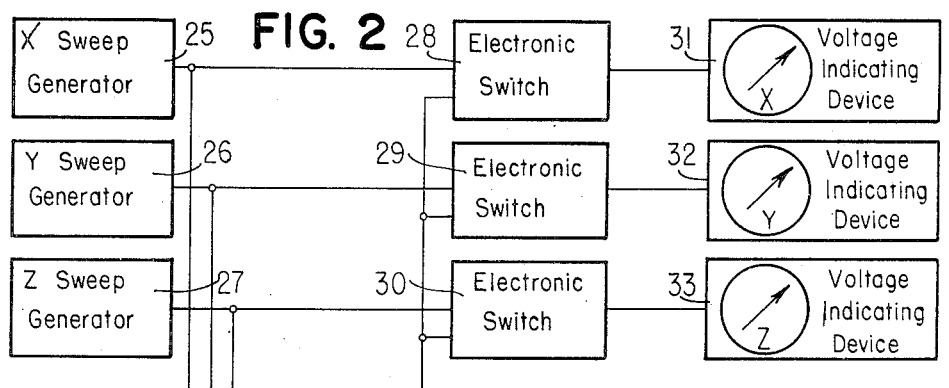
FIG. 2
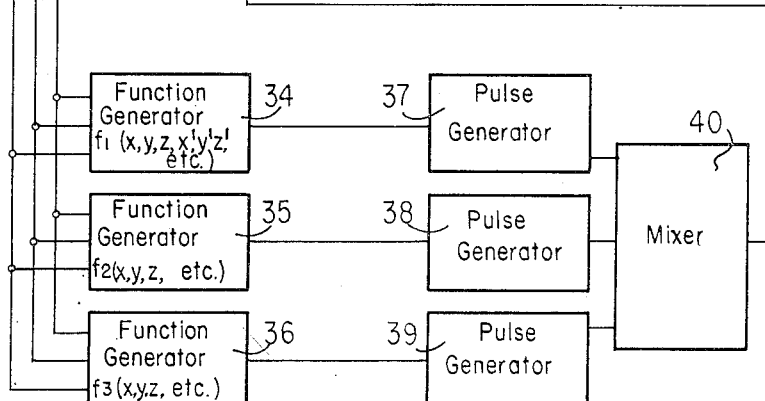
INVENTOR.
Elmer G. Hills
BY Mueller and Mason
Attorneys May 8, 1951  E. G. HILLS  2,551,740
ELECTRONIC COMPUTING APPARATUS
Filed May 3, 1946  3 Sheets-Sheet 3
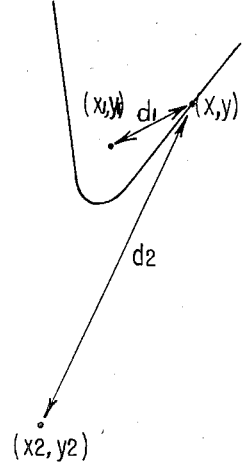
FIG. 4
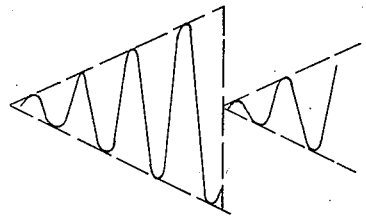
FIG. 6
FIG. 5
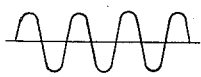
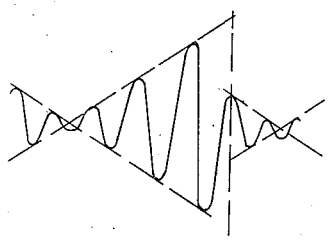
FIG. 7
FIG. 9
FIG. 8
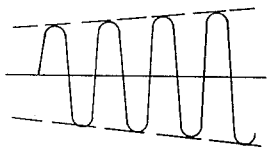
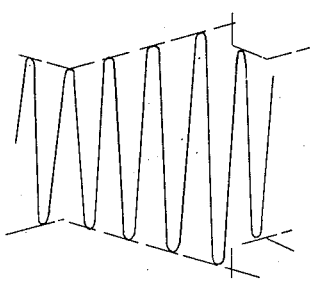
*INVENTOR.*
Elmer G. Hills
BY *Mueller and Mason*
Attorneys Patented May 8, 1951

2,551,740

UNITED STATES PATENT OFFICE 2,551,740

ELECTRONIC COMPUTING APPARATUS

Elmer G. Hills, Chicago, Ill., assignor to Belmont Radio Corporation, Chicago, Ill., a corporation of Illinois Application May 3, 1946, Serial No. 666,891

13 Claims. (Cl. 235—61)

This invention relates generally to apparatus for the solution of equations and more specifically to electronic equipment for simulating a plurality of mathematical functions relating to a set of variables and indicating the value of the variables which satisfy the said equations.

In very recent developed processes such as those relating to the location of signals or of objects which may either be in a given plane or anywhere in space, apparatus has been developed furnishing various relations relating to the position of the signal or object with respect to the apparatus. It is well known that if a sufficient number of equations relating to a set of variables are obtained, it is possible mathematically to find the values of the variables which satisfy all of the equations. However, by use of the ordinary mathematical systems, this is a very laborious and time consuming operation, especially when the equations being solved are complicated. In many applications, such as in military use where it is desired to obtain the location of a movable object to direct fire thereon, it is necessary to compute the location of the object very rapidly as movement of the object renders the information of no value.

It is well known in the art that generators can be constructed which, upon application of input voltages thereto which correspond to the variables of a function, will sweep through the range of values taken on by the function for the values of the variables applied. Such generators have been constructed for simulating most of the known mathematical functions with a large degree of accuracy. To specify a few, it is possible to simulate functions having a plurality of variables, derivatives, integrals, and hyperbolic and transcendental functions. However, simple means have not been provided to utilize these generators to equate and solve the functions which they produce in a manner which will provide the desired information both very accurately and very rapidly.

It is an object, therefore, of the present invention to provide apparatus which will utilize a minimum amount of equipment and will provide a rapid solution to mathematical functions as they occur in equations.

It is a further object of this invention to provide apparatus for graphing mathematical functions including means for simulating the functions and for indicating values which satisfy the functions.

It is another object of this invention to provide electronic apparatus for analyzing mathematical functions relating to the location of an object and for indicating the values which satisfy the functions to provide information as to the location of the object.

A feature of this invention is the provision of electronic apparatus including a cathode ray reproducing tube and means for analyzing functions relating to a plurality of variables and producing an indication on the screen of the cathode ray tube of the values of the variables which satisfy the functions.

Another feature of this invention is the provision of apparatus for solving mathematical equations involving functions including means for producing voltages representing the variables in said function and causing said voltages to sweep through all values of the variables under consideration, means for converting said voltages into voltages which correspond to the values of the functions when the particular values of the variables are applied thereto, and means for indicating the values of the variables which satisfy the said equations.

A further feature of this invention is the provision of means for indicating the position of an object when various functions relating to the position of the object are known including, a plurality of generators adapted to produce voltages simulating the said functions, means for causing the generators to sweep through all values of the functions and means which indicate the values of the variables which satisfy all of the functions.

It is a still further feature of this invention to provide apparatus for indicating the location of an object when it is known that the object resides at the intersection of two plane curves, including function generators for producing voltages simulating said curves, means for causing the generators to sweep through predetermined ranges of values of the coordinates of the curves and means for indicating the values which satisfy both curves thereby indicating where the curves intersect.

Further objects, features and advantages will be apparent from a consideration of the following description taken in connection with the accompanying drawings in which:

Fig. 1 is a schematical diagram of the system to be used for solving functions in accordance with this invention;

Fig. 2 is a modified system which may be used for solving functions relating to any number of variables;

Fig. 4 illustrates a problem which can be solved by the system of Fig. 3; and

Figs. 5 to 9 are charts showing voltage wave forms at various points in the system of Fig. 3.

Figure 3:
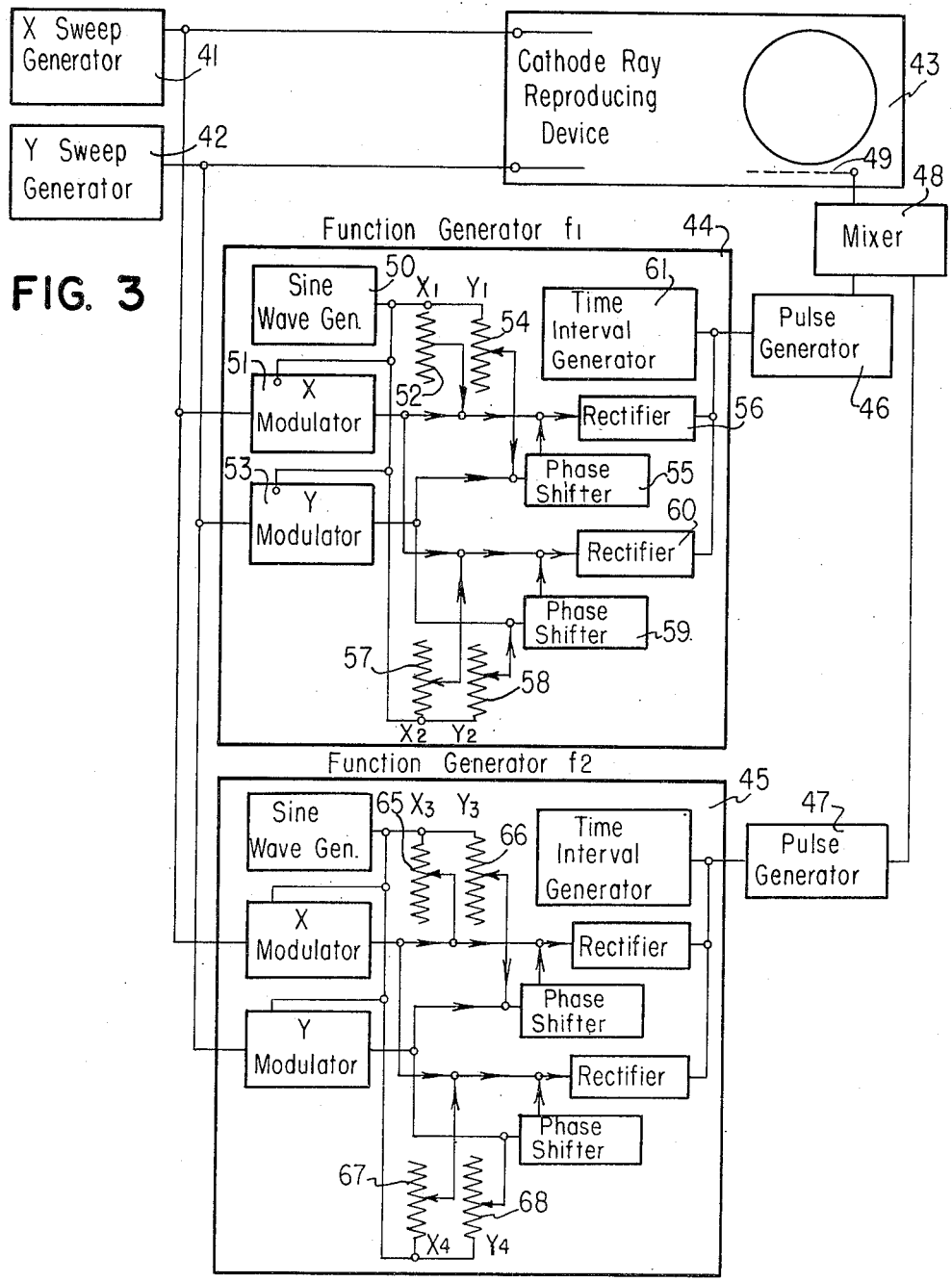
Fig. 3 is a schematical diagram of a specific application of the invention.

In practicing my invention, I provide means for solving equations relating to functions of a plurality of variables, including a plurality of function generators which are arranged to produce voltages simulating the values of the functions when voltages corresponding to the values of the variables are applied thereto. At least as many function generators are required as there are variables in the equations which are to be solved. A plurality of sweep generators equal to the number of variables are provided for applying voltages to the function generators which sweep through all values of the variables in the range being considered. The sweep generators must be of progressively higher frequencies so that one generator will sweep through the desired number of values of one variable, the second generator will sweep through a large number of values of the second variable while the first generator is sweeping through but one value, etc. This predetermined number of values of all the variables are therefore applied to the function generators, which are adapted to produce a predetermined voltage output such as zero when the equations are satisfied. The output of the function generators are fed to pulse generators which are arranged to provide a pulse output when the said predetermined voltage is applied thereto from the function generators. Means are provided for combining the voltages of the various pulse generators and for triggering indicating devices when pulses are simultaneously produced by all the pulse generators. The production of pulses by all the pulse generators at one time indicates that the equations are all satisfied by the values of the variables applied to the function generators at that instant, and the trigger mechanism permits indicating means to indicate these values of the variables, thereby indicating the values which satisfy all the equations.

Referring now to the drawings, in Fig. 1 there is illustrated a system which may be used to solve equations relating to two variables ($x$ and $y$) and for indicating the values of the variables which satisfy the equations on the screen of the cathode ray reproducing device. The system includes a sweep generator 10 which may be a sawtooth generator of standard construction such as is used to produce horizontal deflection of the cathode ray in a television system. A second sweep generator 11 is provided which may be generally similar to the sweep generator 10 except that the output will be of such lower frequency. The generator 11 may also be the standard vertical deflection generator used with cathode ray tubes. The output of the generators 10 and 11 are connected to deflecting electrodes 13 and 14 respectively of the cathode ray reproducing device 12 in the usual manner. The sweep generators designated X and Y are also used to provide voltages representing the variables $x$ and $y$ of the functions being examined, and which vary throughout the range of the variables which is under consideration. These voltages are fed to function generators 15 and 16 respectively. The function generators are constructed so that as voltages are applied thereto by the X and Y sweep generators, the outputs of the function generators will sweep throughout the range of values taken on by the function corresponding to the values of the variables applied thereto. That is, the function generators are constructed to combine the voltages from the sweep generators in the manner specified by the functions so that the output voltages will be the values of the functions for the particular values of the variables applied thereto. As previously stated, function generators can be constructed which will simulate almost any known function. Examples of such function generators are illustrated in Fig. 3 and described more in detail in connection therewith.

The outputs from the function generators are applied to the pulse generators 17 and 18 which are designed to develop a pulse when a particular voltage is applied thereto. In most cases the value of the function being considered will be zero when the desired values of the variables, that is the values to be determined, are applied thereto. For this reason, the function generators will be arranged to produce a zero output voltage when the desired values of the variables are applied thereto, and the pulse generators are arranged to produce a pulse when a zero voltage is applied thereto by the function generator. The pulse generators can be of any suitable construction, one of the simpler forms which is suitable including a full wave rectifier and a simple triode tube. The rectifier is connected to the function generator and rectifies the output thereof to provide a direct current voltage which is applied to the grid of the triode to bias off the triode. When a voltage is produced by the function generator the tube will not conduct but when the output of the function generator is zero, the bias is removed and the triode will conduct to provide a pulse. However, if in a particular application it is desired to find the values of the variables when the functions take on particular known values, the pulse generators can be arranged to produce a pulse when this particular value is impressed thereon. The output of the two pulse generators are delivered to the mixer 19 which combines the pulses and applies them to the control grid 20 of the cathode ray reproducing device 12. As the beam of the cathode ray tube is being deflected by the X and Y sweep generators, the beam will follow the values of $x$ and $y$ applied to the function generators. The cathode ray tube can be biased so that the pulses provided by each pulse generator and delivered through the mixer will cause the beam of the cathode ray tube to be energized to indicate the values of the $x$ and $y$ voltages which produced the pulse. That is, the cathode ray reproducing device would show all of the values of $x$ and $y$ which produce the desired value of the functions set up on both function generators 15 and 16. In the event that the functions set up were continuous functions, this would normally result in two continuous curves appearing on the tube, one produced by the pulses from generator 17 and a second produced by the pulses from generator 18. These curves might cross on the screen indicating the values which satisfy both functions. The screen of the cathode ray tube can be calibrated by applying direct current voltages of known values to the electrodes 13 and 14 and marking the screen to correspond to the position of the beam when these voltages are applied. In any particular application an arbitrary scale must be chosen to set up a relation between the quantity being measured and the voltage which represents this quantity. Alternatively, the cathode ray tube 20 can be biased so that a greater voltage than produced by either of the pulse generators is required to cause a spot to appear on the screen of the tube. The screen would then be illuminated only when pulses appear simultaneously in the generators 17 and 18 and are combined in the mixer 19 to provide a greater voltage which is sufficient to cause a spot to appear on the screen. It is pointed out that the components illustrated in Fig. 1 are all well known components which may be of any standard construction.

Referring now to Fig. 2, a system is illustrated which may be used to solve functions relating to three or more variables. Although the equipment illustrated is suitable for solving equations relating to only three variables, it is obvious that additional components can be provided to extend the number of variables under consideration. In any system, the number of sweep generators would be equal to the number of variables involved, and at least as many function generators would be required if a point solution is desired. The locus of points satisfying certain of the equations could be obtained by use of a lesser number of function generators. The system illustrated includes sweep generators 25, 26 and 27 which are coupled through electronic switches 28, 29 and 30 to voltage indicating devices 31, 32 and 33 respectively. The outputs of the sweep generators are also applied to function generators 34, 35 and 36 the outputs of which are applied to pulse generators 37, 38 and 39 and combined in mixer 40 and then utilized to actuate the electronic switches 28, 29 and 30. The sweep generators, function generators and pulse generators may be of generally similar construction as the corresponding components of Fig. 1 and as previously stated may be well known standard construction.

The sweep generators 25, 26 and 27 will have progressively differing frequencies so that the X sweep generator 25 will have a frequency such that all the values of the variable $x$ will be reproduced for each value of $y$. The Y sweep generator will have a lower frequency and predetermined equally spaced values of the variable $y$ will be produced therein for each value of the variable $z$. The frequency of the Z sweep generator will be still lower, the generator being constructed to produce a predetermined number of equally spaced values of $z$ in the time allowed for the computation. For practical purposes the use of 1000 values of the $y$ and $z$ variables are sufficient to produce a solution of the accuracy desired. The function generators 34, 35 and 36 are each constructed so that when the various $x$, $y$ and $z$ voltages are applied thereto the output of the function generator will produce the values taken on by the particular function under consideration. The function generators will be of different construction, each being designed to combine the voltages from the sweep generators in the manner in which the variables are combined in the equations which are known. The function generators will each provide zero output voltage when the desired values of $x$, $y$ and $z$ are applied thereto. The pulse generators are identical to the pulse generators of Fig. 1 and are arranged so that when zero voltage is applied thereto a pulse is produced. The pulses from the generators 37, 38 and 39 are combined in the mixer 40 and applied to the electronic switches 28, 29 and 30. The electronic switches are arranged so that they will connect the X, Y and Z sweep generators to the indicating devices 31, 32 and 33 only at times when pulses are generated in each of the three pulse generators. That is, sufficient voltage is not applied through the mixer to the electronic switches unless pulses are produced simultaneously by all of the three pulse generators. This condition occurs only when the values $x$, $y$ and $z$ are such that the three functional equations are satisfied. Accordingly, at this instant the electronic switches are opened and the indicating device indicates the values of $x$, $y$ and $z$ which satisfy the equations. Although the electronic switches 28, 29 and 30 may be of various well known constructions, a simple switch can be provided by the use of a vacuum tube which is normally biased to cut-off so that the tube does not conduct. The pulses of the mixer 40 can be applied to the tube to remove the cut-off allowing the tube to conduct and the voltage from the sweep generators to be applied to the voltage indicating devices.

The components of Fig. 1 and Fig. 2 are all standard electronic devices. The sweep generators may be standard sawtooth generators although it is not necessary that the voltages produced be linear but merely that the entire range of values be covered. The function generators will depend on the functions being considered and may be sine wave generators or a combination of various generators. The electronic switches may be any fast operating switch, a vacuum tube biased to cut-off so that it conducts only when the output from the pulse generators is applied to the grid thereof might be used. The voltage indicating device may be standard peak reading vacuum tube voltmeters of any similar devices.

Referring now to Fig. 3, a specific application of the system of Fig. 1 is illustrated. This system is one which may be used to solve a plurality of simultaneous hyperbolas somewhat similar to those obtained in the Loran system used in the location of a receiver in relation to a source of radio signals. The Loran system provides information as to the difference in time required for a signal to reach two points which is an indication of the difference in distances of the source from the two points. As is well known, the locus of points which are at distances from two fixed points which differ by a constant is a hyperbola. This is illustrated in Fig. 4 where $(x, y)$ is any point on the hyperbola to be located, $(x1, y1)$ is one of the foci of the hyperbola and $(x2, y2)$ is the other foci. Stated algebraically, this function is represented by the equation:

$$\sqrt{(x-x1)^2+(y-y1)^2}-\sqrt{(x-x2)^2+(y-y2)^2}=D$$

In applying this equation to the problem, $x$ and $y$ represent the coordinates of the point to be determined. $x1$ and $y1$ represent the coordinates of one of the points where the signal is picked up and $x2$ and $y2$ represent a second point where the signal is picked up. D is the difference in distance $d1$ of the point $(x, y)$ from the point $(x1, y1)$ and the distance $d2$ of the point $(x, y)$ from the point $(x2, y2)$. That is, D equals $d2$ minus $d1$. To find the coordinates of a definite point $(x, y)$ on the hyperbolic curve, it is necessary to obtain an additional relation between the variables such as the equation for a second hyperbola. The equation for a second hyperbola may be obtained by using two different points $(x3, y3)$ and $(x4, y4)$. The process may be simplified somewhat by duplicating one of the locations in the two equations, that is, using $(x1, y1)$ and $(x2, y2)$ for one equation and using $(x2, y2)$ and $(x3, y3)$ for the second equation. If a third equation is desired, points $(x3, y3)$ and $(x4, y4)$ can be used.

The problem now is to provide a function generator which upon the application of various values of $x$ and $y$ thereto will provide an output corresponding to the values of the function set forth above. It is to be noted that in this case the function is solved when D is a particular value so that the function generator must include means for producing a voltage corresponding to D which may be subtracted from the voltage corresponding to the remainder of the function to provide a zero voltage for application to the pulse generator.

Referring now in detail to Fig. 3, the system is shown as in Fig. 1, including X and Y sweep generators 41 and 42, function generators 44 and 45, pulse generators 46 and 47, a mixer 48 and a cathode ray tube 43. The frequency of the X sweep generator is much higher than that of the Y sweep generator so that for each value of $y$, all values of $x$ within the range being considered are produced. A predetermined number of equally spaced values of $y$ are produced, 1000 values having been found to give the required accuracy for most applications. Function generator 44 which simulates the function $f1$ includes a sine wave generator 50 which produces a voltage output of sine wave form and of substantially higher frequency than the X sweep generator. The output of the sine wave generator is illustrated in Fig. 5. This voltage wave is modulated in the X modulator 51 by the voltage from the X sweep generator 41 to produce a resulting voltage, the envelope of which will sweep through all the values of $x$. The modulator 51 and the other modulators in the function generators 44 and 45 may be of any standard construction in which a linear output is provided. This wave is illustrated in Fig. 6. The output of the modulator 51 is combined with the sine wave output from the generator 50 through the variable resistor 52 which is adjusted to provide a voltage proportional to the abscissa of the point $(x1, y1)$, that is, proportional to $x1$. The voltage from the voltage divider 52 is made 180° out of phase with respect to the voltage from the modulator so that a resulting voltage proportional to $(x-x1)$ is produced. As the phase of a standard modulator can be shifted by 180 degrees by changing the polarity of the output coupling thereof, the $(x-x1)$ relation can be produced by considering the output from the sine wave generator as minus so that the voltage developed across the voltage divider 52 ($x1$) is minus and then polling the modulator 51 so that the output voltage of the modulator is 180 degrees out of phase with the voltage across the divider. The resulting voltage is shown in Fig. 7.

Similarly, the voltage from the sine wave generator 50 is modulated in the Y modulator 53 by the voltage through the Y sweep generator 42. This voltage is combined with the voltage from the sine wave generator through voltage divider 54 which provides a voltage proportional to $y1$ and which is combined in such a manner that a voltage $(y-y1)$ is produced. This voltage is shown in Fig. 8. As the frequency of the Y sweep generator is very slow with respect to the frequency of X sweep generator, the change in the amplitude of the sine wave during one horizontal sweep is very slight. To provide the relation required by the function, that is $$\sqrt{(x-x1)^2+(y-y1)^2}$$

it is merely necessary to shift the phase of the $(y-y1)$ voltage through 90° and combine the two voltages vectorially. This is done by providing a phase shifter 55 in the $y$ circuit which shifts the phase through 90° and then combining the shifted $(y-y1)$ voltage wave with the $(x-x1)$ wave. This voltage is shown in Fig. 9.

To provide the function of the second part of the equation, similar apparatus is provided to produce voltages $(x-x2)$ and $(y-y2)$ and to combine the voltages in the same manner. A common sine wave generator and X modulator and Y modulator are provided for both sets of the apparatus. Resistors 57 and 58 are adjusted to correspond to the coordinates $x2$ and $y2$ of the second point. The $(y-y2)$ voltage is shifted 90° in the phase shifter 59 and combined with the $(x-x2)$ voltage. In order to combine the voltages from the two paths in the manner specified, it is necessary that the voltages be numerically subtracted. As these voltages may be out of phase, the voltages from the two paths are rectified in rectifiers 56 and 60 to provide direct current voltages which can be combined to insure the numerical difference.

In order to provide an output voltage which becomes zero when the equation is satisfied, it is necessary to provide a voltage corresponding to D which is the difference between the distances of the two points $(x1, y1)$ and $(x2, y2)$ from the point $(x, y)$ being located. This may be accomplished by producing a voltage corresponding to the difference in time required for a signal from the point $(x, y)$ to reach the two points $(x1, y1)$ and $(x2, y2)$. For producing such a voltage, a sawtooth generator might be started when the signal reaches one point and stopped when the signal reaches a second point, the voltage thereby corresponding to the difference in distances. Sawtooth generators are well known in the art and such a generator may be formed by a condenser which is charged through a large resistor so that the charging current is constant. In the present application means can be provided to normally short the condenser so that the voltage thereacross is zero. An electronic switching arrangement can be provided for removing the short across the condenser when the signal from the unknown point $(x, y)$ is received at the point $(x1, y1)$. For example, the signal received at point $(x1, y1)$ can be used as a synchronization pulse to actuate the switching means. Similarly the signal from $(x, y)$ received at point $(x2, y2)$ can be used as a synchronization pulse to close the switching means to terminate the charging current. It is obvious that the signals received at points $(x1, y1)$ and $(x2, y2)$ can be transmitted to the point where the computing equipment is located by either wire or radio circuits. The time interval generator 61 represents means for producing a voltage which corresponds to D. This voltage is combined with the voltages from the rectifiers 56 and 60 and applied to the pulse generator 46.

As previously stated the pulse generator 46 is arranged to produce a pulse output when a zero voltage is applied thereto. As the function generator 44 has a zero output each time the values of $x$ and $y$ applied thereto by sweep generators 41 and 42 satisfy the equation set forth above, the pulse generator will produce a pulse voltage each time the values of $x$ and $y$ satisfy the equation. This voltage is applied through the mixer 48 to the grid 49 of the cathode ray tube 43. As the cathode ray beam in the tube 43 is controlled by the X and Y sweep generators the location of the spot produced in the cathode ray tube will indicate the various values of X and Y which satisfy the equation. As the function generator 44 is set up to produce a hyperbola the cathode ray tube will show a hyperbola on the screen thereof. The screen will therefore produce an image of the hyperbola as shown in Fig. 4.

The function generator 45 is similar to the function generator 44 except the values of the variable resistances 65, 66, 67 and 68 are adjusted to correspond to points $(x3, y3)$ and $(x4, y4)$ instead of points $(x1, y1)$ and $(x2, y2)$ as in the generator 44. Accordingly, the output of the pulse generator 47 coupled to the function generator 45 will produce voltages which will cause a second hyperbola to appear on the cathode ray tube 43. This hyperbola will intersect the hyperbola produced by the function $f1$ to locate the point or points $(x, y)$ which satisfy both equations. As the two hyperbolas may cross at more than one point, it may be necessary to provide additional information in order to determine the desired values. Such additional information may be provided by a third function generator $f3$ which would be set up to correspond to additional points $(x5, y5)$ and $(x6, y6)$ for example. As previously stated, the same point may be used in more than one equation thereby reducing the number of points of observation required to obtain the information needed. Also, in the system of Fig. 3, the same sine wave generator 50, X modulator 51, and Y modulator 53 may be used for both function generators 44 and 45, thereby reducing the amount of equipment required.

Instead of furnishing the output of both pulse generators 46 and 47 to the grid 49 of cathode ray tube 43 of Fig. 3 as described above, the cathode ray tube may be biased so that a spot of light will occur on the screen only when the sum of the voltages from the two pulse generators are applied thereto by the mixer 48. In this case the screen will not show the curves of the two hyperbolas but will indicate only the points of intersection of the hyperbolas.

It is further seen that I have provided a system for the solution of equations by electronic means utilizing known components and which will provide a rapid solution to problems such as are involved in navigational systems based on radio or radar information. The invention, of course, is not limited to such use but will find application in any instance where a rapid solution to mathematical equations is required.

Although I have described what I consider to be the preferred embodiment of my invention, it is apparent that various changes and modifications therein are possible within the intended scope of the invention as defined in the appended claims.

I claim:

1. Apparatus for determining the values of unknown quantities when a plurality of equations involving functions of said unknown quantities are known, comprising sweep generators for producing voltages representing said quantities and causing said voltages to sweep continuously through a plurality of values in cyclic fashion, and function generators for combining said voltages in the manner in which said quantities are combined in said functions so that output voltages are produced which correspond to the values of said functions when various values of said quantities are applied thereto, said function generators being arranged to produce predetermined output voltages when voltages are applied thereto which satisfy said equations.

2. Apparatus for determining the values of unknown quantities when a plurality of equations involving functions of said unknown quantities are known, comprising sweep generators for producing voltages representing said quantities and causing said voltages to sweep continuously through a plurality of values in cyclic fashion, function generators for combining said voltages in the manner in which said quantities are combined in said functions so that output voltages are produced which correspond to the values of said functions when various values of said quantities are applied thereto, said function generators being arranged to produce predetermined output voltages when voltages are applied thereto which satisfy said equations, and means for indicating the values of said quantities when said equations are satisfied.

3. Apparatus for providing the solution to mathematical equations involving a plurality of variables comprising a plurality of sawtooth generators adapted to produce voltages representing said variables and cause said voltages to sweep through predetermined combinations of values of said variables which are under consideration, a plurality of function generators each representing a particular equation, means for applying the voltages from said sawtooth generators to said function generators, said function generators being adapted to produce zero voltages when the equations represented thereby are satisfied by the voltages applied thereto, a plurality of pulse generators individually connected to said function generators and adapted to produce pulse outputs when zero voltages are applied thereto, indicating means adapted to indicate the instantaneous values of the voltages produced by said sawtooth generators, and means responsive to the outputs of said pulse generators for causing said indicating means to indicate the voltage produced by said generators when pulses are produced simultaneously by all said pulse generators.

4. Apparatus for providing the solution to mathematical equations involving a plurality of variables, comprising a plurality of sawtooth generators adapted to produce voltages representing said variables and cause said voltages to sweep through all values thereof which are under consideration, a plurality of function generators each adapted to represent a particular one of said equations, means for applying the voltages from said sawtooth generators to said function generators, said function generators being adapted to produce zero voltages when the equations represented thereby are satisfied by the voltages applied thereto, a plurality of pulse generators individually connected to said function generators and adapted to produce a pulse output when a zero voltage is applied thereto, indicating means adapted to be individually connected to said sawtooth generators for indicating the instantaneous values of the voltages produced thereby, and means responsive to the outputs of said pulse generators adapted to connect said indicating means to said sawtooth generators when pulses are produced simultaneously by all said pulse generators.

5. Apparatus for providing the solution to mathematical equations involving a plurality of variables, comprising a plurality of sawtooth generators adapted to produce voltages representing said variables and cause said voltages to sweep through all values which are under consideration, said sawtooth generators having different frequencies so that all combinations of predetermined values of each of said variables are obtained, a plurality of function generators each representing a particular one of said equations, means for applying the voltages from said sawtooth generators to said function generators, said function generators being adapted to combine said voltages in the manner in which said variables are combined in said equations and to produce zero voltage when the equations represented thereby are satisfied by the values of the voltages applied thereto, a plurality of pulse generators individually connected to said function generators and adapted to produce a pulse output when a zero voltage is applied thereto, indicating means adapted to be individually connected to said sawtooth generators for indicating the instantaneous values of the voltages produced thereby, and means responsive to the outputs of said pulse generators adapted to connect said indicating means to said sawtooth generators when pulses are produced simultaneously by all said pulse generators.

6. Apparatus for providing the solution to mathematical equations involving two variables, comprising a pair of sawtooth generators adapted to produce voltages representing said variables and cause said voltages to sweep through a given range of values of one variable for certain predetermined values of the other variable, a pair of function generators each representing one of said equations and adapted to combine the voltages from said sawtooth generators in the manner in which the variables are combined in said equation and adapted to produce zero voltages when the voltages applied thereto are of such value that the equations represented thereby are satisfied, a pair of pulse generators individually connected to said function generators and adapted to produce a pulse output when a voltage of zero value is applied thereto, a cathode ray reproducing device including a control grid and horizontal and vertical deflecting electrodes, said electrodes being connected to said sawtooth generators so that the cathode ray is deflected in accordance with the voltages produced thereby, and means for applying the outputs from said pulse generators to said control grid so that the values of the variables which satisfy said equations are indicated on said cathode ray reproducing device.

7. Apparatus for determining the values of unknown quantities when the values of certain mathematical functions of said unknown quantities are known, comprising cyclically operating means for producing voltages respectively representing said quantities and automatically causing said voltages to sweep continuously through a plurality of instantaneous values in cyclic fashion, means for converting said voltages into output voltages which correspond to the values taken on by said functions for said instantaneous values of said quantities, and means under the control of said converting means for indicating the values of the unknown quantities which produce said known values of said functions, said last-named means including voltage producing means having an output proportional to elapsed time and means for combining said output voltages with said output of said voltage producing means for imparting numerical significance to the values of the quantities which produce said known values of said functions.

8. Apparatus for the solution of mathematical equations involving functions of a plurality of variables, comprising cyclically operating means for producing voltages corresponding respectively to said variables and causing said voltages to sweep continuously through a plurality of instantaneous values in cyclic fashion, means for combining said voltages in the manner in which said variables are combined in said functions to provide varying output voltages which correspond to the values taken on by said functions for said instantaneous values of said variables, voltage producing means having an output proportional to known values of said functions, and means under the control of said combining means and said voltage producing means for indicating the values of said variables when the values of said functions equal the known values thereof.

9. Apparatus for the solution of mathematical equations involving functions of a plurality of variables, comprising a plurality of sweep generators for respectively producing voltages corresponding to said variables and causing each of said voltages to sweep continuously through a plurality of instantaneous values in cyclic fashion, a plurality of combining devices for respectively combining said voltages to provide output voltages which correspond respectively to the values taken on by the various functions for said instantaneous values of said quantities, with each of said combining devices having a zero output when the values of the variables represented by said instantaneous voltage values are such as to satisfy one of the equations, and means under the control of said combining devices for indicating the values of said variables which satisfy said equations, said last-named means including means responsive to elapsed time for numerically interpreting the respective times at which the voltages produced by said generators attain those values which make the output voltage of any of said combining devices equal to zero.

10. Apparatus for providing the solution to mathematical equations involving functions of a plurality of variables, comprising a plurality of sweep generators for producing voltages respectively corresponding to said variables and sweeping each of said voltages continuously through a plurality of instantaneous values in cyclic fashion, a plurality of computing devices for combining said voltages into output voltages which correspond respectively to the values of the various functions for said instantaneous values of said variables, voltage-responsive means associated with each of said computing devices for detecting when the function represented by the output voltage thereof has a predetermined value for satisfying an equation, and elapsed-time responsive means controlled by said voltage-responsive means for imparting numerical significance to the respective times at which the output voltages attain said predetermined value to indicate the values of said variables satisfying the equations.

11. Apparatus for determining the values of unknown quantities when the values of certain mathematical functions of said unknown quantities are known, comprising cyclically operating means for producing voltages respectively representing said quantities and automatically causing each of said voltages to sweep continuously through a plurality of instantaneous values in cyclic fashion, with said voltages being swept at different time rates, means for converting said voltages into output voltages which correspond to the values assumed by said functions for said instantaneous values of said quantities, means responsive to the output of said converting means for determining when each of said output voltages attains a value corresponding to the known value of a function, and means controlled by said voltage-responsive means for numerically interpreting the times in their respective cycles when said sweep voltages attain those values which produce said known values of said functions.

12. Apparatus for the solution of mathematical equations relating to a plurality of variables, comprising a cathode ray tube, cyclically operating means for producing voltages corresponding to said variables and causing each of said voltages to sweep continuously through a plurality of instantaneous values in cyclic fashion, means applying said sweep voltages to said cathode ray tube, other means for converting said voltages into output voltages by combining said voltages in the manner in which said variables are combined in said equations, means for determining when said output voltages are of such predetermined value that the mathematical equations are satisfied, and means under the control of said determining means for indicating on said cathode ray tube the values of the variables which satisfy said equations according to the respective magnitudes of the sweep voltages when said output voltages attain said predetermined values.

13. Means for determining the values of the coordinates which simultaneously satisfy a plurality of equations for plane curves, such means comprising a plurality of sweep generators for respectively generating voltages that are swept continuously through predetermined ranges of values in cyclic fashion, a cathode ray tube, means applying said sweep voltages to said cathode ray tube, a plurality of computing devices each operative to combine said sweep voltages in the manner in which the coordinates are combined in one of said equations, means for detecting when the combined voltage in each of said computing devices reaches a predetermined value indicating that the respective equation is satisfied, and means controlled by said detecting means and affecting said cathode ray tube for causing the values of the coordinates which satisfy said equations to be represented on said tube in positions determined by the respective magnitudes of the sweep voltages when the equations are satisfied.

ELMER G. HILLS.

REFERENCES CITED

The following references are of record in the file of this patent:

UNITED STATES PATENTS

| Number | Name | Date |
|---|---|---|
| 1,893,009 | Ward | Jan. 3, 1933 |
| 2,415,190 | Rajchman | Feb. 4, 1947 |
| 2,454,549 | Brown | Nov. 23, 1948 |
| 2,455,974 | Brown | Dec. 14, 1948 |
| 2,459,106 | Hardy | Jan. 11, 1949 |